United States Patent [19]

Sakoh

[11] Patent Number: 5,268,987
[45] Date of Patent: Dec. 7, 1993

[54] SPEED CONTROL DEVICE FOR DC MOTOR
[75] Inventor: Masahiko Sakoh, Anjo, Japan
[73] Assignee: Makita Corporation, Anjo, Japan
[21] Appl. No.: 977,632
[22] Filed: Nov. 17, 1992
[30] Foreign Application Priority Data Nov. 20, 1991 [JP] Japan .................. 3-332499

[51] Int. Cl.⁵ .............................................. H02P 5/17
[52] U.S. Cl. .................................. 388/819; 318/245; 318/248
[58] Field of Search ............... 318/599, 244, 245, 246, 318/248, 254, 268, 139; 388/804, 811, 819, 829, 831

[56] References Cited

U.S. PATENT DOCUMENTS

| | | | |
|---|---|---|---|
| 3,916,272 | 10/1975 | Grunleitner et al. | 318/138 |
| 4,078,194 | 3/1978 | Johnson, Jr. | |
| 4,291,259 | 9/1981 | Marumoto et al. | |
| 4,458,183 | 7/1984 | Neilson | 318/139 |
| 4,481,448 | 11/1984 | Bishop | 318/248 |
| 4,527,101 | 7/1985 | Zavis et al. | 318/245 |
| 4,873,453 | 10/1989 | Schmerda et al. | 318/599 X |

Primary Examiner—Bentsu Ro
Attorney, Agent, or Firm—Dennison, Meserole, Pollack & Scheiner

[57] ABSTRACT

A speed control device for a DC motor includes a voltage maintaining circuit connected between the DC motor and a comparator circuit for maintaining the voltage corresponding to an electromotive force when a pulse wave outputted from a pulse-width extension circuit is at a level for off-operation of a switch element. Additionally, an average voltage maintaining circuit is connected between the DC motor and the comparator circuit and maintains in average the voltage corresponding to the back electromotive force produced in the DC motor during the time when the control pulse signal outputted from the control pulse signal output circuit is not at a level for on-operation of the switch element.

2 Claims, 10 Drawing Sheets (a)

(b)

(c)

(d)

(e)

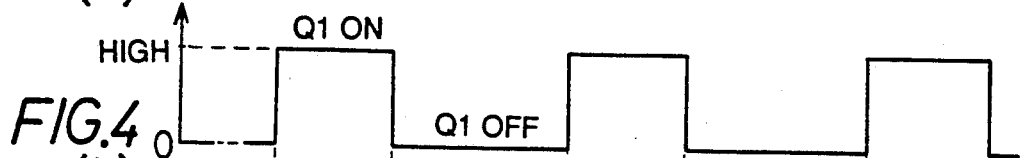
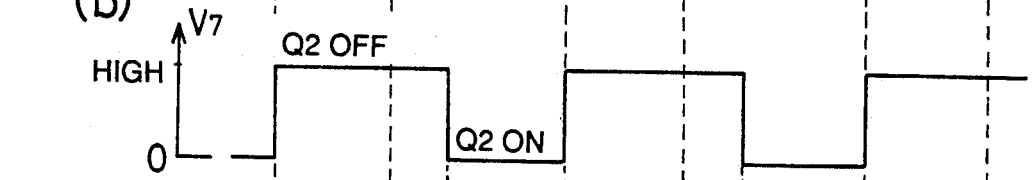
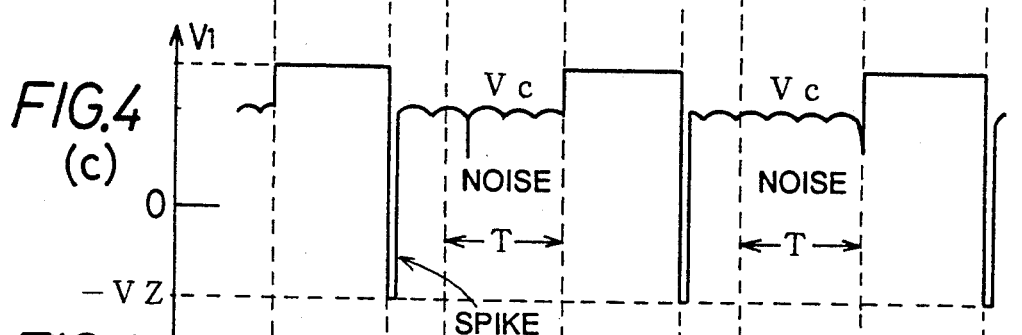
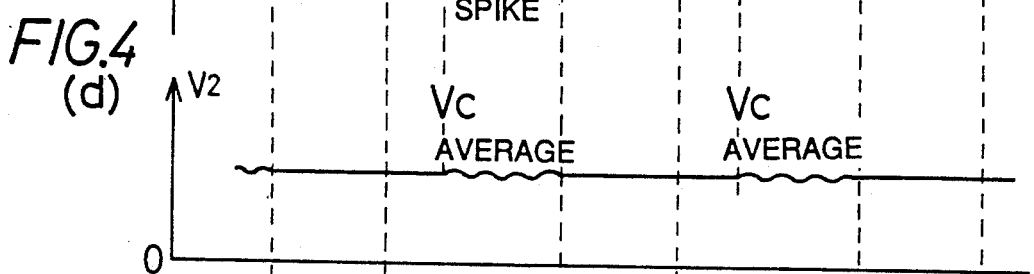
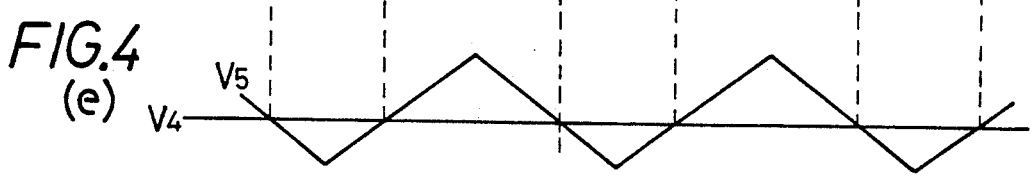

(a)

(b)

FIG. 7
(a)
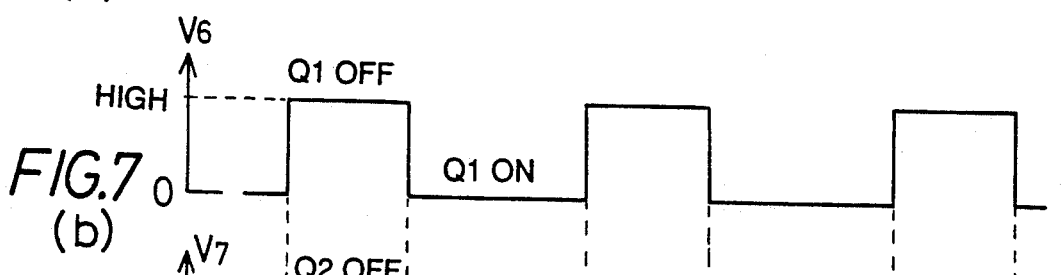
(b)
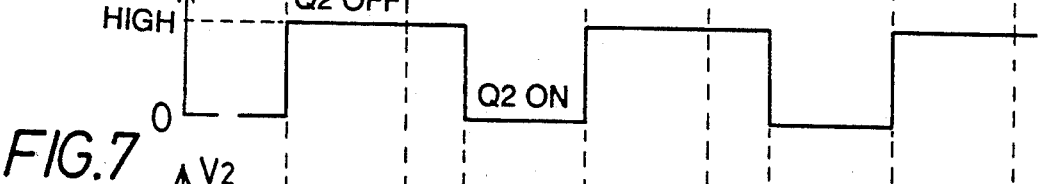
(c)
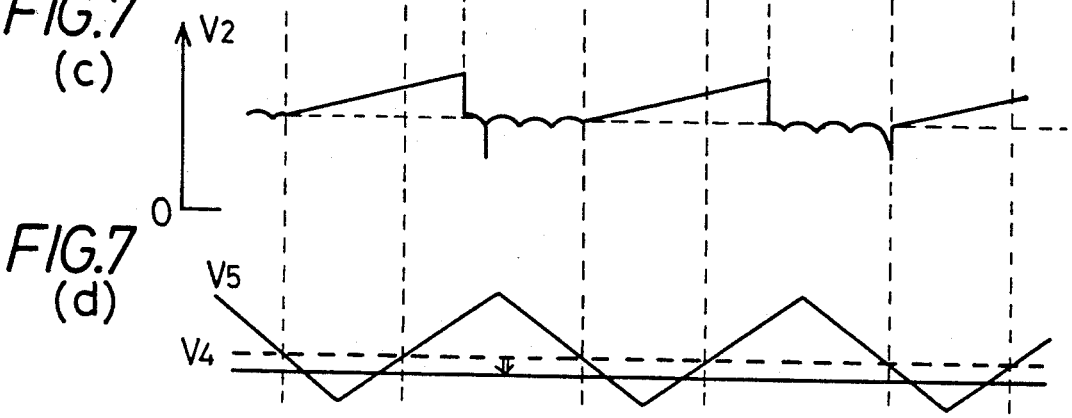
(d)
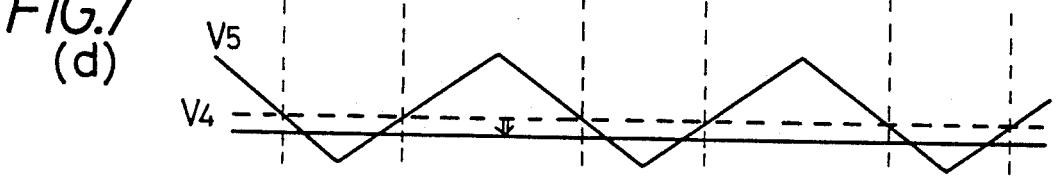

(a)

(b)

(c)

(d)

PRIOR ART

SPEED CONTROL DEVICE FOR DC MOTOR

BACKGROUND OF THE INVENTION

1. Field of the Invention

The present invention relates to a speed control device for a DC motor, and more particularly to a speed control device which obtains a signal representative of the speed of the DC motor from a voltage corresponding to the back electromotive force generated in the DC motor during the OFF-state operation of a duty cycle control switch and which performs a feedback control based on the signal obtained.

2. Description of the Prior Art

A conventional speed control device for a DC motor is shown in FIG. 9 and mainly includes a switch element Q1 and a control pulse signal output circuit S1.

The switch element Q1 is connected in series between a DC power source A and a DC motor M, so that the power from the DC power source A is supplied to the DC motor M when the switch element Q1 is turned on while the power is not supplied to the DC motor M when the switch element Q1 is turned off.

More specifically, a power supply voltage V0 is applied to the DC motor M when the switch element Q1 is turned on. A voltage Vc corresponding to a back electromotive force is produced in the DC motor M when the switch element Q1 is turned off (see FIGS. 10(a) and 10(b)). The voltage Vc becomes higher as the rotational speed of the DC motor M increases.

A motor voltage V1 which may be the voltage V0 or the voltage Vc is applied to a voltage maintaining circuit 2 of a control pulse signal output circuit S1. The voltage maintaining circuit 2 also receives a control pulse signal V6 for controlling the switch element Q1 to be turned on or off. During a first level of the control pulse signal V6 to turn on the switch element Q1, the voltage maintaining circuit 2 outputs a voltage V2 corresponding to the motor voltage V1 which is produced when the control pulse signal V6 is changed from a second level to turn off the switch element Q1 to the first level. During the second level of the control pulse signal V6, the voltage maintaining circuit 2 outputs the voltage V2 corresponding to the motor voltage V1 at that time. Thus, as shown in FIG. 10(c), the output voltage V2 has a value substantially corresponding to the voltage Vc which corresponds to the back electromotive force produced during off-operation of the switch element Q1. Consequently, throughout the operation, the output voltage V2 becomes higher as the rotational speed of the DC motor M increases.

The output voltage V2 is subtracted from a set voltage V3 and the subtracted voltage is amplified by an amplifying circuit 4 to obtain a voltage V4 which becomes lower as the rotational speed of the DC motor M increases and which becomes higher as the rotational speed decreases. The amplified voltage V4 is compared with a non-constant voltage V5 by a comparator circuit 6. As shown in FIG. 10(d), the non-constant voltage V5 changes its value at a predetermined frequency which provides a basis of a duty cycle of the switch element Q1. The comparator circuit 6 outputs the first level of the control pulse signal V6 to turn on the switch element Q1 when the amplified voltage V4 (which becomes higher as the rotational speed of the DC motor M decreases) exceeds the non-constant voltage V5. As will be apparent from FIG. 10(d), as the rotational speed of the DC motor M decreases, or the amplified voltage V4 becomes higher, the period during the amplified voltage V4 exceeds the non-constant voltage V5 becomes longer, so that the period during the switch element Q1 is kept on becomes longer. As a result of this, the duty cycle for driving the DC motor M is increased to compensate for the low speed rotation of the DC motor M or to increase the rotational speed of the DC motor M. On the other hand, if the rotational speed of the DC motor M becomes higher, the duty cycle is decreased to reduce the rotational speed of the motor M.

The construction of the control pulse signal output circuit S1 shown in FIG. 9 may be variously modified. For example, the voltage V2 of the voltage maintaining circuit 2 may be applied to a minus input terminal of the comparator circuit 6 without inversion. Further, the voltage V2 may be compared with a summing voltage of the set voltage V3 and the non-constant voltage V5.

The requirement of the control pulse signal output circuit S1 is that the comparator circuit 6 receives the voltage corresponding to the back electromotive force generated in the DC motor M directly from the DC motor or through other means when the switch element Q1 is not on; the control pulse signal V6 supplied to the switch element Q1 has a longer period of the first level for turning on the switch element Q1 as the voltage corresponding to the back electromotive force decreases; and consequently, a feedback control of the DC motor M is performed to control the rotational speed of the DC motor M at a predetermined value.

The prior art device may be properly operated as long as the output voltage V2 of the voltage maintaining circuit 2 is maintained as shown in FIG. 10(c). However, in an instant of turning the switch element Q1 from on to off, energy stored in an inductance coil of the DC motor M is emitted as a spike which changes the motor voltage V1 to a large extent as shown in FIG. 10(e).

To this end, a zener diode ZD is conventionally connected in parallel to the DC motor M to clip a spiked voltage to a predetermined value (−VZ in case of FIG. 10(e)) so as to prevent damage of the switch element Q1, etc. Thus, the spiked voltage can be reduced by determining a zener voltage VZ to have a smaller value. However, in such a case, the period of production of the spiked voltage becomes longer in response to the reduction of the zener voltage VZ.

The output voltage V2 is inputted to the amplifying circuit 4 which normally has an integration function. Therefore, the output voltage V4 of the amplifying circuit will have a saw teeth-like wave configuration which is strongly influenced by the spike as shown in FIG. 10(f). Even if the zener voltage VZ has been lowered, the output voltage V4 will still have the saw teeth-like wave configuration since the period of production of the spiked voltage becomes longer as described above.

If such output voltage V4 having saw teeth-like wave configuration is inputted to the comparator circuit 6, the output voltage V6 becomes unstable. Thus, even if the rotational speed of the DC motor M becomes low, the period during on-operation of the switch element Q1 may not always become longer but on-period of the switch element Q1 may be short at one time and may be long at the other time. To avoid this problem, the integration function of the amplifying circuit 4 may be increased to smooth the amplified voltage. However, the response speed is lowered in this case, and therefore, the rotational speed cannot be satisfactorily controlled.

Further, as shown in FIG. 10(b), the voltage Vc corresponding to the back electromotive force changes at relatively short cycle because of a contacting relationship between a brush and a commutator. Additionally, the voltage Vc may be easily influenced by various kinds of noises. Therefore, the voltage maintaining circuit 2 may not keep the voltage Vc at the level corresponding to the back electromotive force produced in the DC motor M, but the voltage maintaining circuit 2 may maintain the voltage Vc influenced by the noises as shown in the right-most portion of FIG. 10(e). Also in this case, the comparator circuit 6 may not receive the voltage Vc which corresponds to the back electromotive force.

As described above, the prior art circuit shown in FIG. 9 is easily influenced by noises, and it practically cannot perform the feedback control in a stable manner.

SUMMARY OF THE INVENTION

It is, accordingly, an object of the present invention to provide a speed control device for a DC motor which prevents a comparator circuit from receiving a voltage that has a value which is different from the back electromotive force of the DC motor because of a spike or noise, so as to permit a stable feedback control.

According to the present invention, there is provided a speed control device for a DC motor. The speed control device includes a switch element which supplies power to the DC motor and turns ON/OFF for duty cycle control of the DC motor, and a control pulse signal output circuit which inputs, to a comparator circuit, a voltage corresponding to the back electromotive force produced in the DC motor while the switch element is turned OFF, and which outputs, to the switch element, a level part of the control pulse signal for the on-operation of the switch element which has a longer period as the back electromotive force of the DC motor becomes smaller. A first aspect of the present invention incudes the improvement comprising:

a pulse-width extension circuit for receiving the control pulse signal outputted from the control pulse signal output circuit, and extending the period of the level part of the control pulse signal for on-operation of the switch element so as to output pulse wave in which the timing to change to a level part for off-operation of the switch element is delayed; and a voltage maintaining circuit connected between the DC motor and the comparator circuit for maintaining the voltage corresponding to the back electromotive force when the pulse wave outputted from the pulse-width extension circuit is at a level for off-operation of the switch element.

A second aspect of the present invention includes the improvement comprising:

an average voltage maintaining circuit connected between the DC motor and the comparator circuit for maintaining an average of the voltage corresponding to the back electromotive force produced in the DC motor during the time when the control pulse signal outputted from the control pulse signal output circuit is not at a level for on-operation of the switch element.

In operation of the first aspect of the present invention, because of the provision of the pulse-width extension circuit, the voltage maintaining circuit does not maintain the motor voltage during on-operation of the switch element and also does not maintain the motor voltage during the time immediately after the switch element has been turned off or the time when the motor voltage may become unstable because of a spike. Thus, the value kept by the voltage maintaining circuit is that of the motor voltage which has been produced after the switch element has been turned off and the influence of the spike has been eliminated. Such value corresponds to the back electromotive force of the DC motor without influence of the spike. Therefore, the comparator circuit receives the voltage which is not influenced by the spike and which corresponds to the back electromotive force of the DC motor.

In operation of the second aspect of the present invention, the average voltage maintaining circuit does not merely keep an instant value but keep an averaged value. Therefore, even if the motor voltage changes with time because of contact relationship between a brush and a commutator or influence of noises, the maintained value becomes the averaged value which is not influenced by the noise, etc.

Thus, according to the first or the second aspect of the present invention, the voltage inputted to the comparator circuit exactly corresponds to the back electromotive force of the DC motor. Therefore, a stable feedback control can be performed without influence of the noises, etc.

The invention will become more fully apparent from the claims and the description as it proceeds in connection with the drawings.

BRIEF DESCRIPTION OF THE DRAWINGS

FIGS. 4(a) to 4(e) are diagrams showing operation of the circuit shown in FIG. 1;

FIGS. 7(a) to 7(d) are diagrams showing operation of the first feedback circuit;

Figures 10A, 10B, 10C, 10D, 10E, 10F:
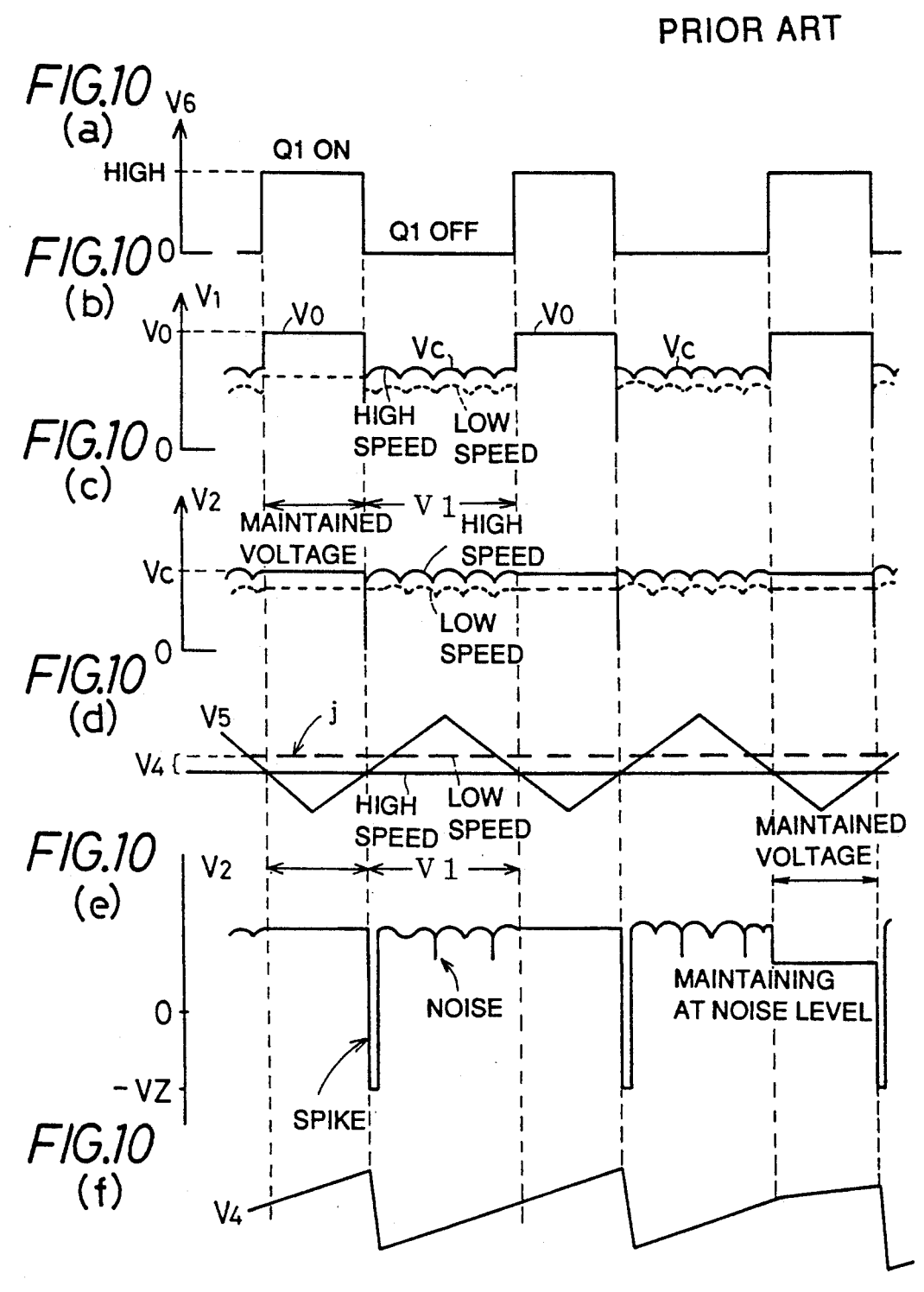

FIG. 10(a) to 10(f) are diagrams showing operation of the circuit shown in FIG. 9.

DETAILED DESCRIPTION OF THE PREFERRED EMBODIMENT

Figure 1:
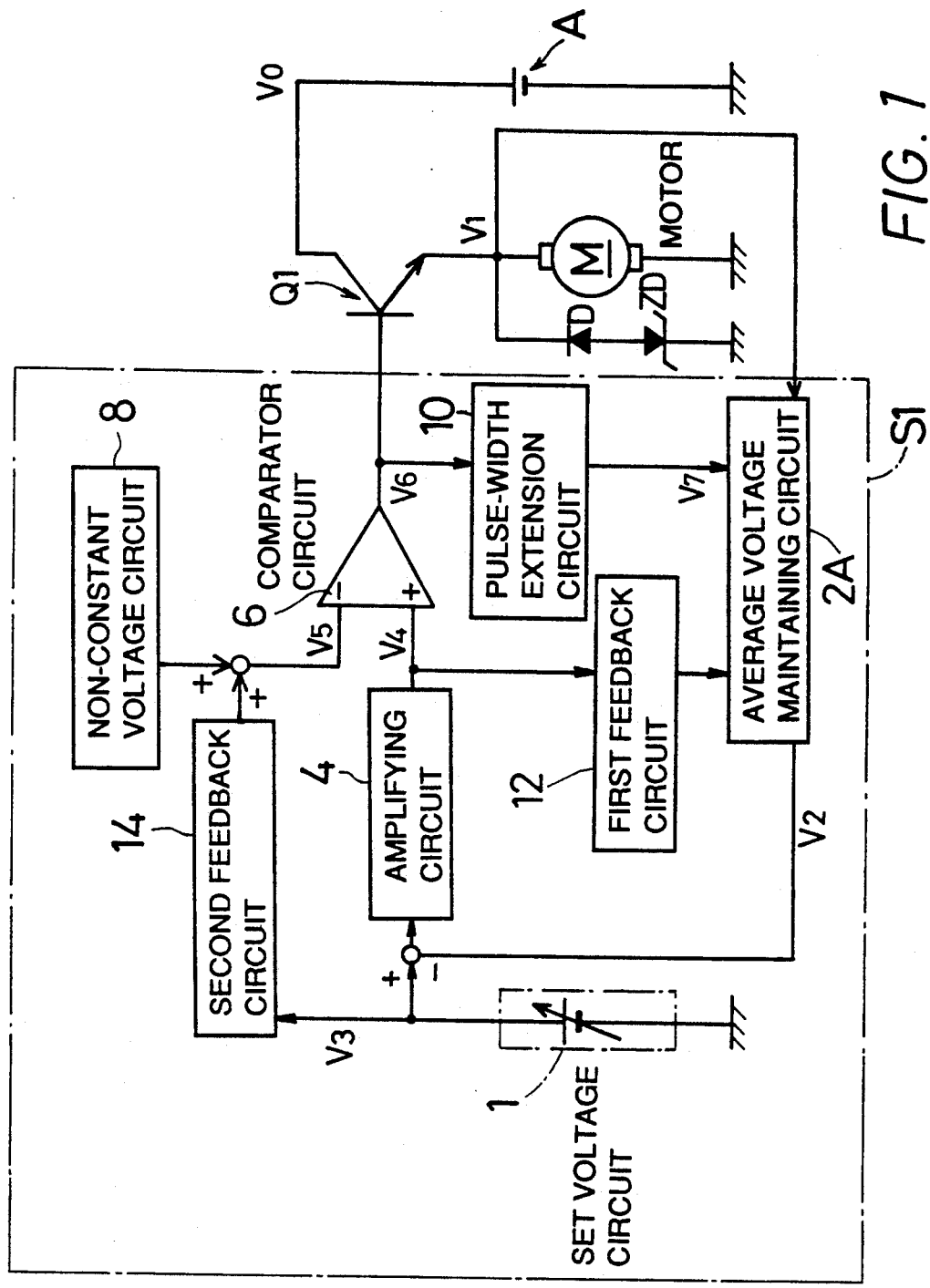
FIG. 1 is a circuit configuration of a device for controlling the rotational speed of a DC motor according to an embodiment of the present invention.
Figure 9:
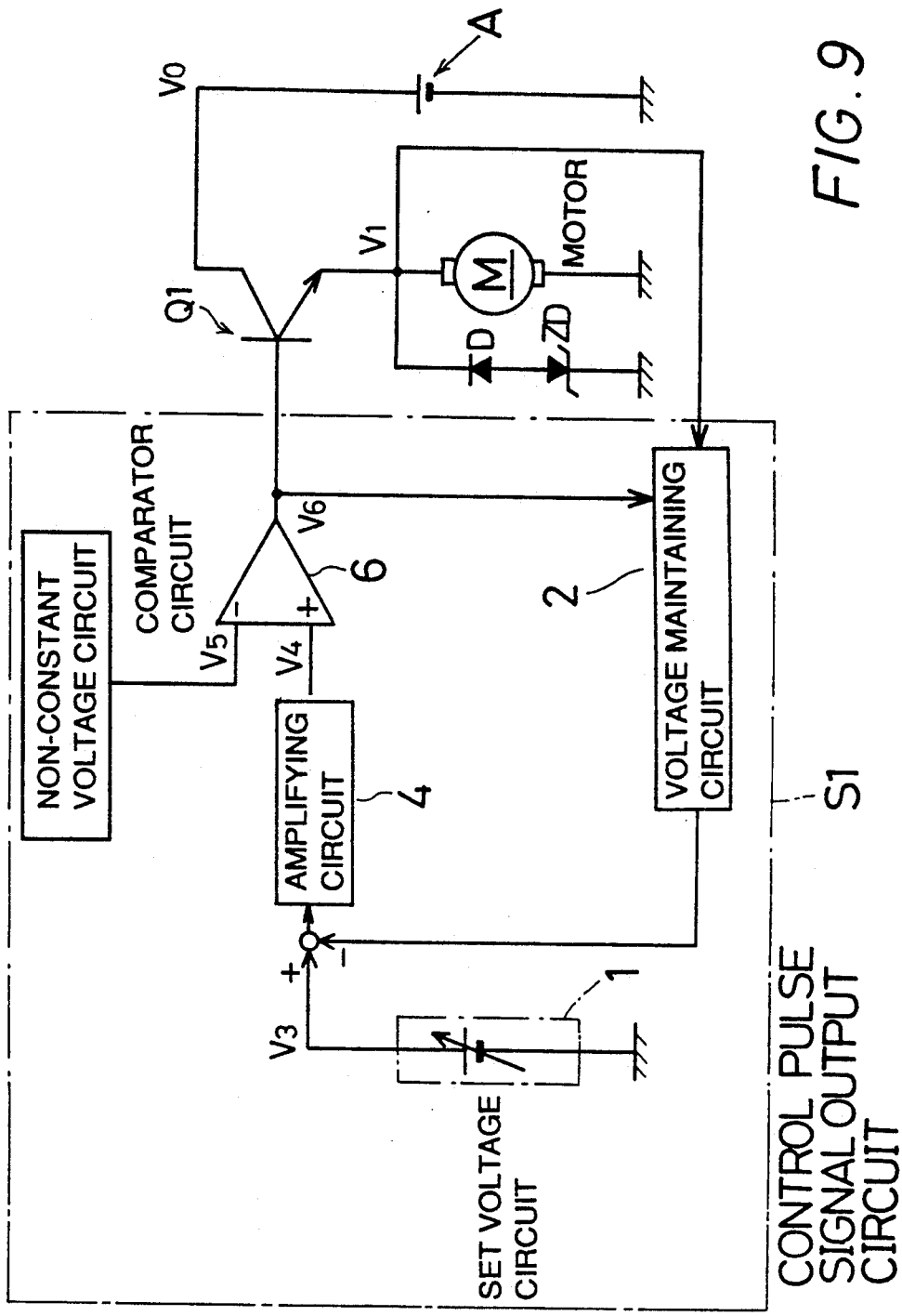
FIG. 9 is a circuit configuration of a prior art device for controlling the rotional speed of a DC motor.

Referring to FIG. 1, there is shown a speed control device for a DC motor M in which a first and a second aspect of the present invention are embodied together as one control circuit. In addition to the circuit configuration as shown in FIG. 9, the device includes a pulse-width extension circuit 10 for the first aspect. Further, the voltage maintaining circuit 2 of the prior art circuit is replaced by an average voltage maintaining circuit 2A according to the second aspect. The device shown in FIG. 1 further includes a first feedback circuit 12 and a second feedback circuit 14.

Only the addition of the pulse-width extension circuit 10 or only the replacement of the voltage maintaining circuit 2 by the average voltage maintaining circuit 2A is effective to provide more stable feedback control compared with the prior art control. Thus, although the first and second aspects are included in this one embodiment, it is not necessary to incorporate both the first and the second aspects.

Figure 3:
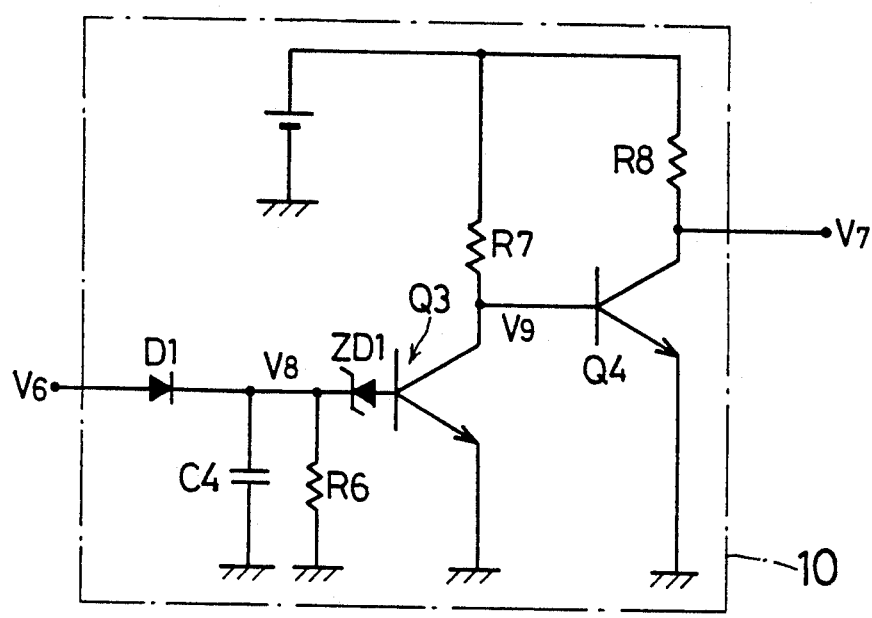
FIG. 3(a) is a circuit configuration of a pulse-width extension circuit.
FIGS. 3(b) to 3(e) are diagrams showing operation of the circuit shown in FIG. 3(a)
Figure 3:
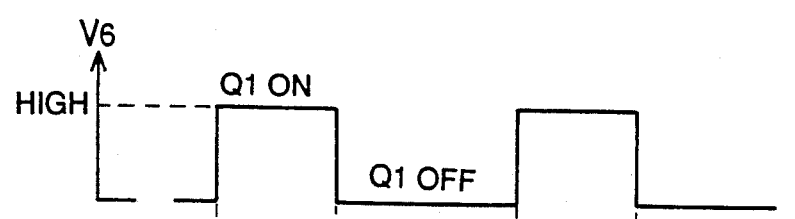
Figure 3:
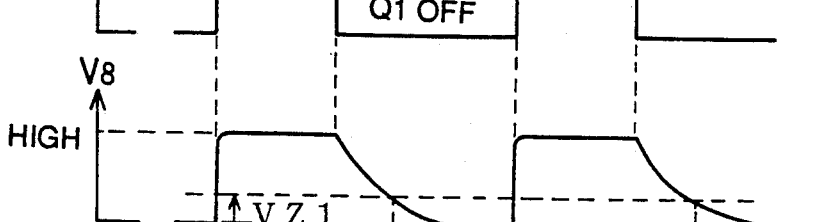
Figure 3:
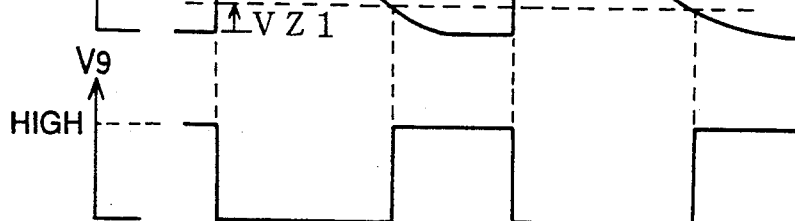
Figure 3:
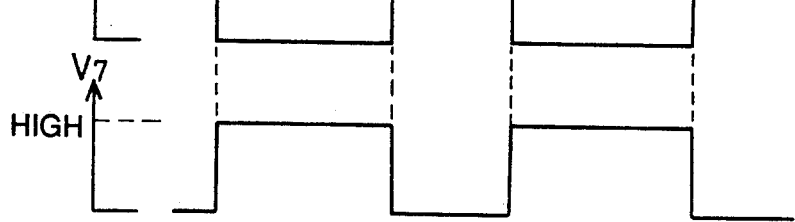

The construction of the pulse-width extension circuit 10 will now be explained with reference to FIG. 3. The pulse-width extension circuit 10 mainly includes a CR circuit for inputting a control pulse signal V6 of a switch element Q1 via a diode D1, a circuit for inputting an output voltage V8 of the CR circuit to a base of a switch circuit Q3 via a zener diode ZD1, and a switch element Q4 for inverting on and off of the switch element Q3.

A capacitor C4 has relatively small capacity, so that it is rapidly charged when the voltage V6 is at a higher level. On the other hand, a resistor R6 has relatively large resistance, so that the charged capacitor C4 is slowly discharged when the voltage V6 is at a lower level as shown in FIG. 3(c). Since the zener diode ZD1 is broken down at a level VZ1 which is lower than the higher level of the control pulse signal V6, the switch element Q3 is turned on immediately after the voltage V6 becomes the higher level and is kept on until the voltage of the capacitor C4 becomes lower than the level VZ1 after the switch element Q1 has been turned off. Therefore, a base voltage V9 of the switch element Q4 has a wave configuration in which a pulse width for on-operation of the switch element Q1 has been extended.

The switch element Q4 is turned off when the switch element Q3 is turned on while it is turned on when the switch element Q3 is turned off. Therefore, a collector voltage V7 of the switch element Q4 corresponds to the inverted base voltage V9. Thus, the collector voltage V7 has a wave configuration which becomes a higher level at the same time when the control pulse signal V6 becomes the higher level, but becomes a lower level after the control pulse signal V6 has been changed to the lower level. This means that the period of the higher level becomes longer than that for on-operation of the switch element Q1. The voltage V7 having the pulse width thus extended is inputted to the average voltage maintaining circuit 2A.

Figure 2:
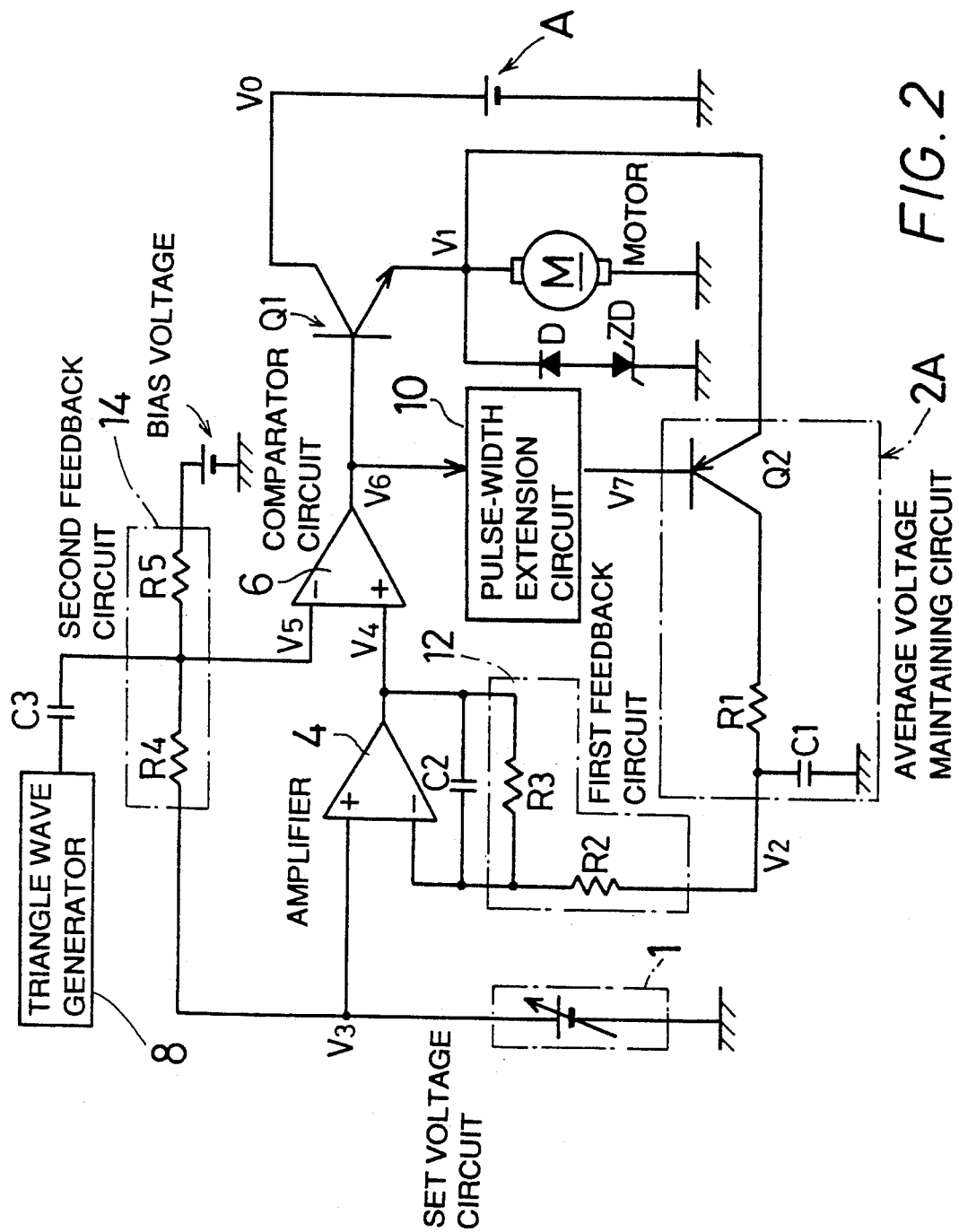
FIG. 2 is a view similar to FIG. ,1 but showing an average voltage maintaining circuit, a first and a second feedback circuit in detail.

As shown in FIG. 2, the average voltage maintaining circuit 2A includes a switch element Q2, a resistor R1 and a capacitor C1. The voltage V7 having the extended pulse width is inputted to a base of the switch element Q2. The switch element Q2 is turned off during on-operation of the switch element Q1 and is thereafter kept off for the extended period. Thus, as shown in FIGS. 4(a), 4(b) and 4(c), the switch element Q2 is kept off during the period of application of a power source voltage to the DC motor M and its subsequent predetermined non-application period of the power source voltage during which the spike may influence the operation of the switch element Q2. The capacitor C1 therefore receives the motor voltage V1 during only a period T in which the voltage Vc corresponding to the back electromotive force of the DC motor M is produced, so that it may not be influenced by the spike. An output voltage V2 of the average voltage maintaining circuit 2A consequently becomes an averaged voltage within the period T.

As described above, since the influence of the spike may be eliminated by the pulse-width extension circuit 10, the output voltage V2 may have a value substantially corresponding to the back electromotive force even if the average voltage maintaining circuit 2A is not provided. However, with the provision of the average voltage maintaining circuit 2A, the output voltage V2 is kept at the averaged voltage, so that a more stable feedback control can be performed without receiving influence of noises.

On the other hand, since the average voltage maintaining circuit 2A is not constructed to merely keep the motor voltage V1 when the switch element Q1 is turned off, the influence of the spike may be eliminated to some extent through the averaging process even if the pulse-width extension circuit 10 is not incorporated. Thus, the average voltage maintaining circuit 2A is modified from the prior art voltage maintaining circuit 2 in such a manner that it does not merely keep an instant value but keeps the averaged voltage, so that more excellent result can be obtained.

Further, since the average voltage maintaining circuit 2A includes the capacitor C1 and the resistor R1 for the averaging process, the motor voltage Vc within the period T in FIG. 4(c) is averaged as shown in FIG. 4(d). Thus, the output voltage V2 is provided as the back electromotive force, eliminating the influence of noises.

As shown in FIG. 2, this embodiment includes a triangle wave generator 8 as a non-constant voltage circuit which outputs a non-constant voltage V5 as shown in FIG. 4 (e). The non-constant voltage V5 is inputted to one of input terminals of a comparator 6 while an amplified voltage V4 is inputted to the other of the input terminals.

The amplified voltage V4 is amplification of the difference between the averaged voltage or output voltage V2 from a set voltage V3. As described above, the influence of a spike or noises is eliminated from the average voltage V2, and therefore the amplified voltage V4 is also not influenced by the spike or the noises. Thus, the amplified voltage V4 received by the comparator circuit 6 exactly corresponds to the back electromotive force of the DC motor M, and therefore, a stable feedback control can be performed.

The first feedback circuit 12 will now be explained with reference to FIG. 2. The first feedback circuit 12 includes resistors R3 and R2 for adjusting gain of an amplifier 4. Between the resistor R2 and the capacitor C1, there is interposed no high impedance element which is normally provided. By eliminating such high impedance element, a feedback function is provided between the amplified voltage V4 and the averaged voltage V2.

Figure 6:
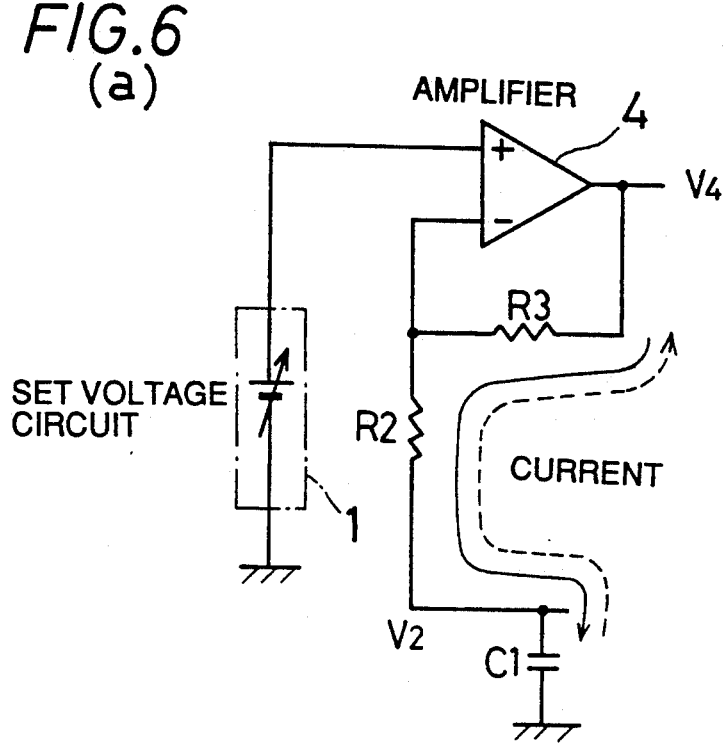
FIGS. 6(a) to 6(c) are schematic views showing operation of the first feedback circuit.
Figure 6:
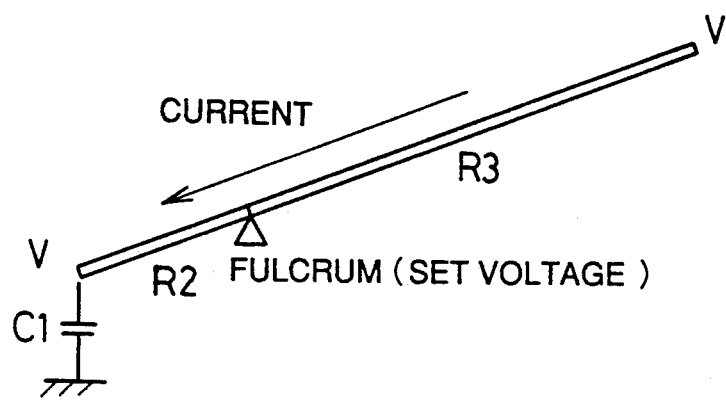
Figure 6:
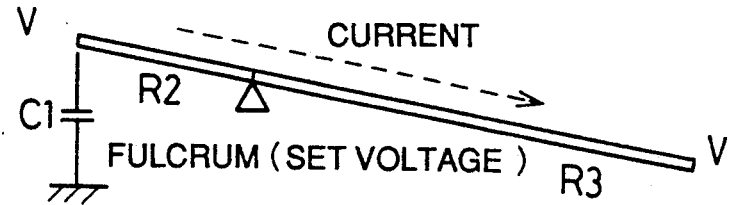

FIG. 6(a) shows how the feed back circuit 12 is operated. The amplified voltage V4 and the averaged voltage V2 are not always equal to each other. By adjusting the values of the resistor R2 and R3, they can be balanced to have a relationship as V4>V2 or as V4<V2.

If the voltages V4 and V2 are balanced to have the relationship as V4>V2 through adjustment of the resistors R2 and R3, a current flows in a direction shown by an arrow of a solid line in FIG. 6(a), and the averaged voltage V2 gradually increases during on operation of the switch element Q2 as shown in FIG. 7(c). Therefore, the amplified voltage V4 tends to decrease as shown in FIG. 7(d) (from a level shown by a dotted line to a level shown by a solid line).

Figure 5:
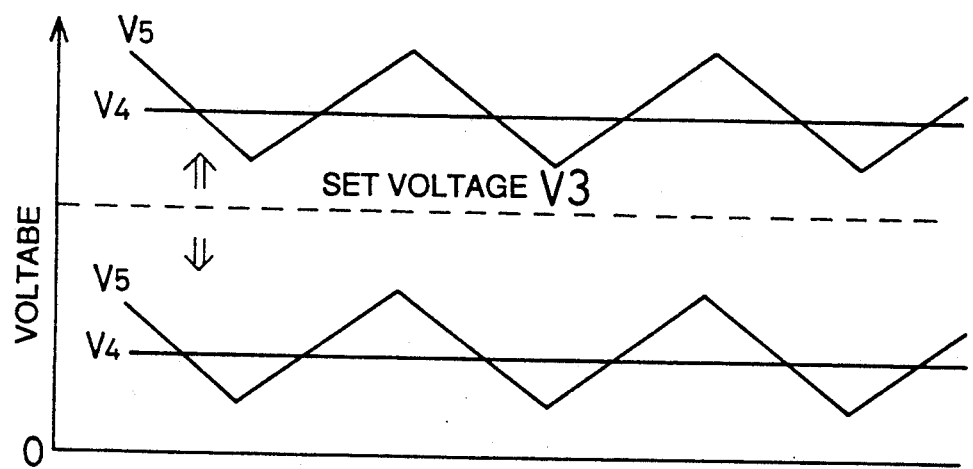
FIG. 5(a) is a graph showing operation of a second feedback circuit.
FIG. 5(b) is a graph showing characteristic properties given by the first feedback circuit as well as the second feedback circuit.
Figure 5:
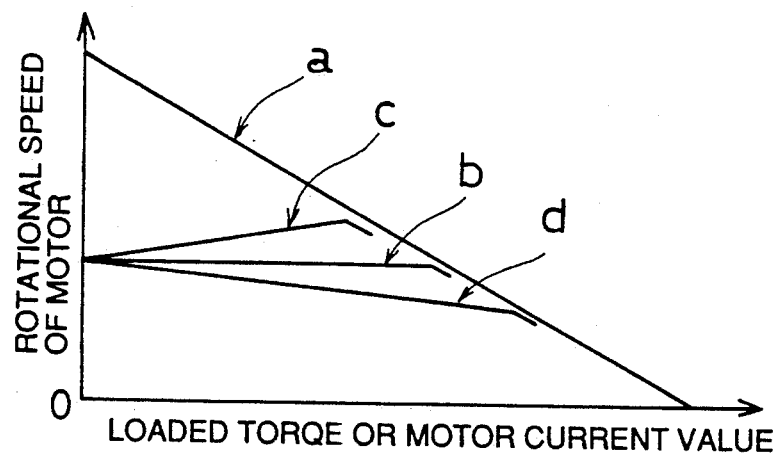

This may provide a tendency to decrease a duty cycle, and therefore, through incorporation of this tendency to the feedback control for maintaining the rotational speed of the DC motor M to a predetermined value, a characteristic line d as shown in FIG. 5(b) can be obtained.

In case the DC motor M is utilized to drive a power driven tool, it is preferable to drive a tool at a constant speed as indicated by a characteristic line b for a normal operation. However, to drive a certain kind of tool, the characteristic line d is preferable for ease of operation. Then, the voltages V4 and V2 are balanced to have the relationship as V4>V2 through adjustment of the resistors R2 and R3.

Figure 8:
FIGS. 8(a) to 8(d) are diagrams similar to FIGS. 7(a) to 7(d) but showing a different operation.
Figure 8:
Figure 8:
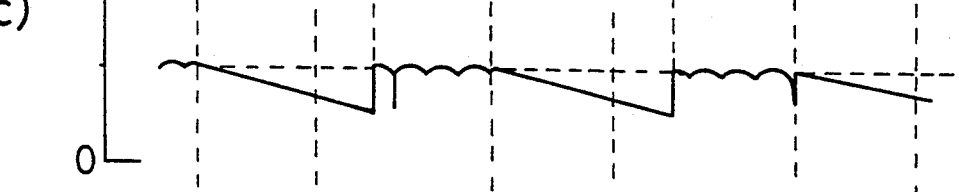
Figure 8:
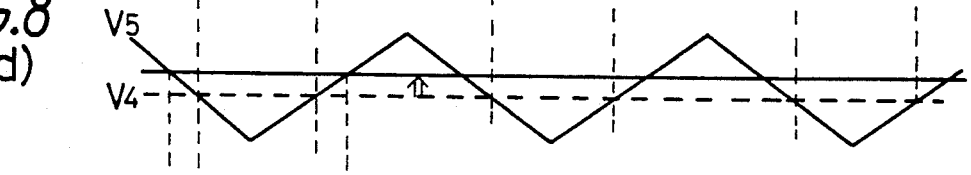

On the other hand, when the voltages V4 and V2 are balanced to have the relationship as V2>V4, the current flows as indicated by an arrow of dotted line in FIG. 6(c) or FIG. 6(a). This may provide a tendency that the averaged voltage V2 decreases as shown in FIG. 8(c). Therefore, the amplified voltage V4 tends to increase from the level indicated by the dotted line to the level indicated by the solid line in FIG. 8(d). Consequently, there is provided a tendency to increase the duty cycle, and a characteristic line c as shown in FIG. 5(b) can be obtained.

Thus, through addition of the first feedback circuit 12, it becomes possible to give different tendency to the feedback control for the constant motor speed.

The second feedback circuit 14 will now be explained. The second feedback circuit 14 includes resistors R4 and R5 as shown in FIG. 2. Thus, the second feedback circuit 14 functions to provide the non-constant voltage V5 which is inputted to the comparator circuit 6 and changes in response to change of the set voltage V3 outputted from a set voltage circuit 1. The set voltage V3 is adjustable to a higher value for a higher rotational speed of the DC motor M and to a lower value for a lower rotational speed of the DC motor M.

By adjusting the values of the resistors R4 and R5, it becomes possible to adjust the level of the amplified voltage V4 or the level of the non-constant voltage V5, so that the flow of the current in the first feedback circuit 12 can be controlled. Thus, the characteristic lines c, b and d as shown in FIG. 5(b) can be obtained without changing gain of the amplifier 4.

Various modification can be made to the circuit configuration of the pulse-width extension circuit 10 and that of the average voltage maintaining circuit 2A.

Further, the circuit configuration for inputting to the comparator circuit 6 can be variously modified. For example, the comparator circuit 6 may compare any two of the set voltage V3, the back electromotive force and the non-constant voltage V5 with the remaining one of them so as to keep on the switch element Q1 for a long time when the motor speed is lowered.

While the invention has been described with reference to a preferred embodiment thereof, it is to be understood that modifications or variations may be easily made without departing from the scope of the present invention which is defined by the appended claims.

What is claimed is:

1. In a DC motor speed control device, a pulse signal output circuit (S1) for turning on and off a switch element (Q1) connected between a power source (A) and a motor (M), said pulse signal output circuit (S1) comprising a comparator circuit (6), a voltage maintaining circuit (2) and a non-constant voltage circuit (8) wherein:

said comparator circuit (6) compares an output from the voltage maintaining circuit (2) with an output from the non-constant voltage circuit (8) and outputs a first level for turning on the switch element (Q1) or a second level for turning off the switch element (Q1) according to the result of comparison;

said voltage maintaining circuit (2) receives at an input a voltage (V1) from the junction between the switch element (Q1) and the motor (M) and outputs a voltage (V2) which is equal to the voltage (V1) while the comparator circuit (6) outputs the second level, said voltage maintaining circuit outputs the voltage (V2) which is equal to the voltage (V1) at the time when the output from the comparator circuit (6) is changed from the second level to the first level while the comparator circuit (6) outputs the first level;

said non-constant voltage circuit (8) outputs a voltage (V5) which changes its value at a predetermined frequency;

the improvement comprising:

a pulse width extension circuit (10) connected between said comparator circuit (6) and said voltage maintaining circuit (2), said pulse width extension circuit receiving the output from the comparator circuit (6) and for outputting to the voltage maintaining circuit (2) a pulse wave in which the timing of changing from the first level to the second level is delayed.

2. In a DC motor speed control device, a pulse signal output circuit (S1) for turning on and off a switch element (Q1) connected between a power source (A) and a motor (M), said pulse signal output circuit (S1) comprising a comparator circuit (6), a voltage maintaining circuit (2) and a non-constant voltage circuit (8) wherein:

said comparator circuit (6) compares an output from the voltage maintaining circuit (2) with an output from the non-constant voltage circuit (8) and outputs a first level for turning on the switch element (Q1) or a second level for turning off the switch element (Q1) according to the result of comparison;

said voltage maintaining circuit (2) receives at an input a voltage (V1) from the junction between the switch element (Q1) and the motor (M) and outputs a voltage (V2) which is equal to the voltage (V1) while the comparator circuit (6) outputs the second level, said voltage maintaining circuit outputs the voltage (V2) which is equal to the voltage (V1) at the time when the output from the comparator circuit (6) is changed from the second level to the first level while the comparator circuit (6) outputs the first level;

said non-constant voltage circuit (8) outputs a voltage (V5) which changes its value at a predetermined frequency;

the improvement comprising:

a voltage averaging means is added to the voltage maintaining circuit, so that the voltage maintaining circuit outputs an averaged voltage of the voltage (V1) corresponding to the back electromotive force produced in the motor (M) while the comparator circuit (6) outputs the second level, and said voltage maintaining circuit outputs said averaged voltage at the time when the output from the comparator circuit (6) is changed from the second level to the first level while the comparator circuit (6) outputs the first level.

* * * * *